(12) United States Patent
Entani (10) Patent No.: US 7,493,271 B2
(45) Date of Patent: Feb. 17, 2009

(54) MEDIATION SERVICE METHOD FOR COLLECTING AND SELLING PIECES OF SELLING PRICE INFORMATION THAT MATCHES A REQUEST

(75) Inventor: Naruto Entani, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 1353 days.

(21) Appl. No.: 09/987,667

(22) Filed: Nov. 15, 2001

(65) Prior Publication Data
US 2002/0059133 A1 May 16, 2002

(30) Foreign Application Priority Data
Nov. 16, 2000 (JP) ............................. 2000-350314

(51) Int. Cl.
*G06Q 30/00* (2006.01)
(52) U.S. Cl. .......................................... 705/26; 705/27
(58) Field of Classification Search ................... 705/26, 705/27; 235/383
See application file for complete search history.

(56) References Cited

U.S. PATENT DOCUMENTS

| | | | | |
|---|---|---|---|---|
| 5,794,207 | A * | 8/1998 | Walker et al. | 705/1 |
| 6,131,087 | A * | 10/2000 | Luke et al. | 705/26 |
| 6,282,517 | B1 * | 8/2001 | Wolfe et al. | 705/36 R |
| 6,574,608 | B1 * | 6/2003 | Dahod et al. | 705/26 |
| 6,785,661 | B1 * | 8/2004 | Mandler et al. | 705/39 |
| 6,961,712 | B1 * | 11/2005 | Perkowski | 705/27 |
| 6,965,872 | B1 * | 11/2005 | Grdina | 705/26 |
| 6,976,006 | B1 * | 12/2005 | Verma et al. | 705/27 |
| 2004/0078274 | A1 * | 4/2004 | Aarnio | 705/26 |

FOREIGN PATENT DOCUMENTS

| | | |
|---|---|---|
| EP | 1 035 488 A1 | 9/2000 |
| JP | 9-251468 | 9/1997 |
| JP | 10-63725 | 3/1998 |
| JP | 11-120253 A | 4/1999 |
| JP | 11-224293 A | 8/1999 |

OTHER PUBLICATIONS

"The Comparison Shopping Game" Response, v9, n6, p. 34+. (Mar. 2000). (via Dialog).*

(Continued)

*Primary Examiner*—Jagdish N Patel
*Assistant Examiner*—Sara Chandler
(74) *Attorney, Agent, or Firm*—Sughrue Mion, PLLC (57) ABSTRACT

A system and method for mediating a providing selling information over a network is provided. The method includes receiving an information request that requests selling price information about a commodity from at least one information requester terminal, and communicating the information request to a plurality of information provider terminals; collecting pieces of selling price information that are received from part of the plurality of information provider terminals, and match the information request, in response to the information request, and generating collected selling price information that matches the information request; supplying the collected selling price information to the information requester terminal, and charging the information requester terminal a prescribed information supply fee and mediation commission; and performing processing for paying a prescribed informer fee to the part of the plurality of information provider terminals that provided the pieces of selling price information that match the information request.

17 Claims, 9 Drawing Sheets

OTHER PUBLICATIONS

"The best ways to buy stuff online: Shopping," by Geary, Leslie Haggin; Bennett, Andrea. Money, v29, n11, pp. 104-108. 2000 (via Dialog).*

"Shoppers Get New Powers on Web Sites," by Deborah Kong. Knight-Ridder Tribune Business News, Aug. 9, 1999. (via Dialog).*

"Jupiter Forum—Shopping Bots Appear Unstoppable," by Kevin Featherly. Newsbytes. May 22, 2000. (via Dialog).*

"Comparison Shopping Made Easy." PR Newswire. Oct. 26, 1998.*

"ClickTheButton.com, Inc. Announces Free Internet Service Enabling Single Click Price Comparisons While Browsing Book Titles at Amazon.com, Barnesandnoble.com and Booksamillion.com." Business Wire. Friday, Mar. 26, 1999. (via Dialog).*

* cited by examiner

PRICE SURVEY REQUEST
COMMODITY LIST

CLASSIFICATION: PERSONAL COMPUTER

| MAKER | PRODUCT NAME | AREA RESTRICTION | LIMIT PRICE | NUMBER OF REQUESTS | DEADLINE DATE/TIME |
|---|---|---|---|---|---|
| AE | PW001 | WITHIN TOKYO METROPOLITAN AREA | ¥52,000 | 12 | 2000/3/11 PM3:00 |
| AE | PW001 | WITHIN TOKYO METROPOLITAN AREA | ¥51,000 | 4 | 2000/3/8 PM2:00 |
| AE | PW001 | UNSPECIFIED | ¥50,000 | 8 | 2000/3/5 PM8:00 |
| AE | PW001 | UNSPECIFIED | ¥52,500 | 27 | 2000/3/8 PM2:00 |
| AE | PC025 | UNSPECIFIED | ¥85,000 | 1 | 2000/3/9 PM3:00 |
| AE | PC025 | AKIHABARA AND ITS NEIGHBORHOOD | ¥79,000 | 2 | 2000/3/9 PM9:00 |

CLICK ON THE LINE CORRESPONDING TO
A COMMODITY ITEM TO WHICH YOU INTEND
TO PROVIDE INFORMATION

MEDIATION SERVICE METHOD FOR COLLECTING AND SELLING PIECES OF SELLING PRICE INFORMATION THAT MATCHES A REQUEST

BACKGROUND OF THE INVENTION

The present invention relates to a mediation service method for collecting and selling pieces of selling price information. In particular, the invention relates to a mediation service method for collecting, for example, pieces of selling price information of a commodity with lower prices over a network in response to a request from a user, and supplying those pieces of selling price information to the user.

In recent years, auctions etc. using the Internet have come to be carried out actively, whereby an environment that enables trading of a commodity or the like between individuals, for example, at a low commission is now being established.

Among conventional techniques relating to the mediating service of selling price information is a shopping assisting apparatus disclosed in Japanese Unexamined Patent Publication (JP-A) No. H 10-63725. To assist a user in generating of a shopping memo based on sales advertisements of respective stores, this shopping assisting apparatus markets a commodity the user wants to buy. For this purpose, the shopping assisting apparatus obtain advertisements over a network and forms a table of those advertisements that enables easy search and thereby quickly supplies the user with price information or the like of each store. In this manner, the shopping assisting apparatus guides a user in determining a store that markets a commodity he wants to buy and that matches his requirements.

A commodity search system is known that is disclosed in Japanese Unexamined Patent Publication (JP-A) No. H 9-251468. In this commodity search system, a host computer that connects, via a network, users and commodity management systems provided in respective stores is supplied. The host computer receives pieces of commodity information from the commodity management systems automatically with prescribed timing, and processes the received pieces of commodity information into data that matches user needs, for example so as to arrange commodities on order of prices. When receiving a request from a user over the network, the host computer supplies the user the pieces of commodity information with data obtained by processing in accordance with the user's request.

In the above shopping assisting apparatus and the commodity search system, a mediation means such as a host computer is supplied. The mediation means receives information relating to commodities from stores, generates commodity information, convenient for a user, of a commodity the user wants to buy, and supplies the generated commodity information to the user. The commodity search system which relates to information collection, shows that information collection is performed automatically with prescribed timing.

However, the above configurations cannot provide a system capable of supplying commodity information to a user efficiently with a sophisticated mechanism that properly benefits both of stores that provide a commodity at lower prices and a user who wants to buy the commodity.

SUMMARY OF THE INVENTION

An object of the present invention is therefore to provide a service method that mediates between stores and a user by generating selling price information that satisfies both sides based on pieces of commodity price information held by stores or individuals such as commodity selling prices of stores.

To attain the above object, the invention realizes, as a business, by providing a management server for establishing an accounting system, a selling price information mediation service method. The management server is an information processing apparatus, mediates an information requester who requests commodity information and information providers who provide commodity information, collects commodity information, generates selling price information, and supplies it to the information requester. That is, the management server directly receives, over a network, requirements of an information requester, collects pieces of commodity information that satisfy the requirements, generates commodity selling price information that satisfy the requirements, and supplies it to the information requester.

More specifically, the invention provides a selling price information mediation service method that is a method for mediating and supplying, over a network, selling price information including selling prices of a commodity in respective stores and information about the stores.

A system that realizes this method comprises at least one information requester terminal that requests selling price information, a plurality of information provider terminals that provide the selling price information, and a management server that is an information processing apparatus. The management server mediates selling price information between the information requester terminal and the information provider terminals, over a network.

The management server executes the steps of the followings. One is receiving, from the information requester terminal, an information request that requests selling price information about a commodity, and communicating the information request to the information providers. Another is collecting pieces of selling price information that are received from part of the information provider terminals and match the information request, and generating collected selling price information that matches the information request. Another is supplying the collected selling price information to the information requester terminal, and charging the information requester terminal a prescribed information supply fee and mediation commission. And the other is performing processing for paying a prescribed informer fee to the part of the information provider terminals that provided the pieces of selling price information that match the information request.

The above method can realize a business in which the operation manager receives an information supply fee and a mediation commission from the information requester and pays informer fees to the information providers, the difference being a profit In the above mediation service method, the selling price information mediating service may employ a membership system. And the management server may register an information requester and information providers as members after causing them to clarify their identities, and may identify a person who has caused a problem by distributing erroneous information upon occurrence of the problem.

The management server may keep a history of an information provider who caused a problem and disclose the history to the information requester terminal. This allows the information requester to judge the reliability of the selling price information of each information provider terminal.

The request information may include information indicating a restrictive area where an information requester can buy the commodity. And the management server may supply the information requester terminal with only pieces of selling price information of stores located in the restrictive area.

The management server may supply the information requester terminal with part of the collected selling price information that excludes information about stores before supplying the collected selling price information to the information requester terminal.

The management server may perform processing for paying a prescribed informer fee to only part of the information provider terminals that provided pieces of selling price information with some ones of a lowest selling price and prices close to it after selling the collected selling price information to the information requester terminal.

The operation of the above selling price information mediation service method is as follows The management server that is an information processing apparatus receives, from the terminal of an information requester, survey information about a commodity for which the information requester wants to survey a selling price or the like. The received survey information is publicized for the terminals of information providers who are registered as members in the management server, in order to collect pieces of selling price information. The management server extracts pieces with lower selling prices information from pieces of selling price information provided by the terminals of information providers, sells the extracted pieces of selling price information to the information requester through his terminal, and charges the information requester an information supply fee and a mediation commission. The management server performs processing for paying informer fees to the information providers who provided the pieces of selling price information that have been sold to the information requester. A business is established because the mediation by the management server produces a profit that is equal to the information supply fee and the mediation commission received from the information requester minus the informer fees paid to the information providers. An income can also be expected by allowing advertisements to be put in the service.

DESCRIPTION OF THE PREFERRED EMBODIMENT

The present invention will be hereinafter described in detail with reference to the accompanying drawings.

Figure 1:
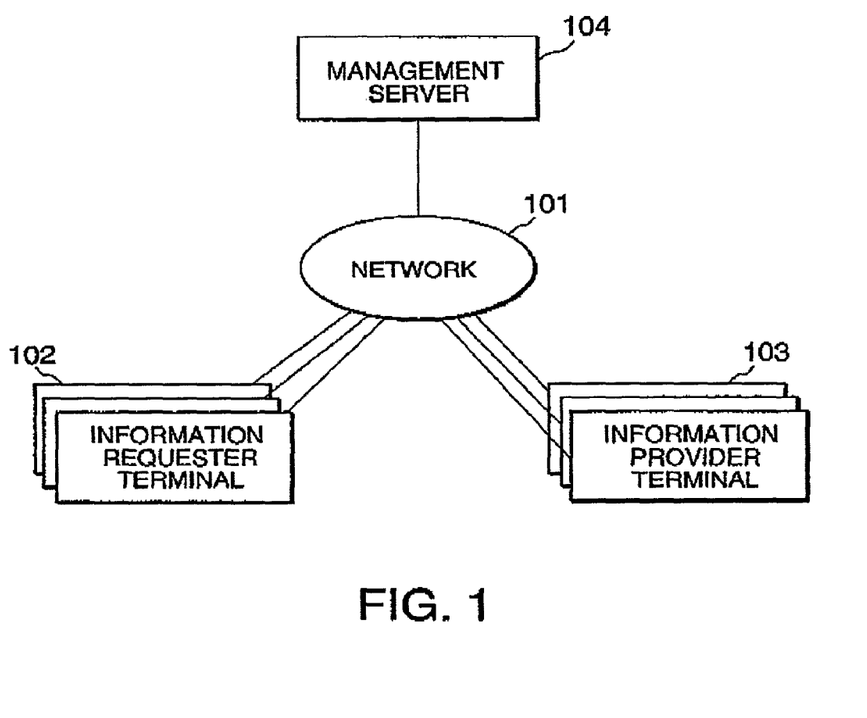
FIG. 1 shows a system that realizes a selling price information mediating service according to an embodiment of the present invention.

The configuration of a system that realizes a selling price information mediating service according to an embodiment of the invention will be described below with reference to FIG. 1. The system is composed of a network 101 and an information requester terminal 102, a plurality of information provider terminals 103, and one management server 104 all of which are connected to the network 101.

The management server 104 is an information processing apparatus that is operated by a person (hereinafter referred to as "operation manager") who operates and manages the selling price information mediating service being discussed. Being a personal computer, for example, the information requester terminal 102 is installed and manipulated by a person (hereinafter referred to as "information requester") who wants to collect pieces of selling price information with lower selling prices. Being a personal computer, for example, each information provider terminal 103 is installed and manipulated by a person (hereinafter referred to as "information provider") who wants to provide selling price information with a lower selling price.

The above system configuration provides an environment in which the information requester terminal 102 and the information provider terminals 103 can exchange data over the network 101 with the management server 104 serving as a mediator.

Figure 2:
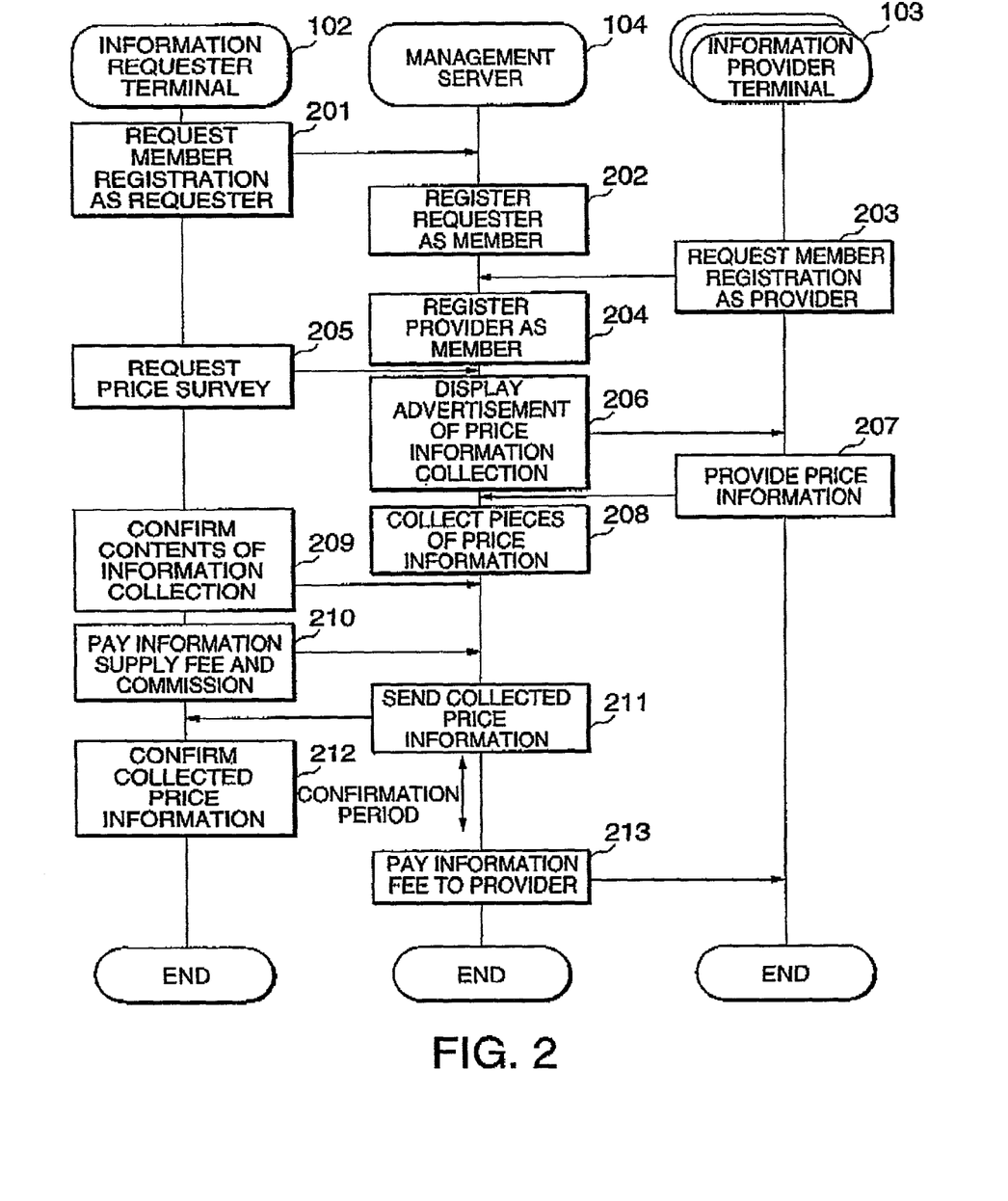
FIG. 2 is a flowchart showing exemplary functions and operations of the system of FIG. 1.

Next, exemplary functions and operations of the system of FIG. 1 will be described with reference to a flowchart of FIG. 2. The information requester terminal 102, the information provider terminals 103, and the management server 104 have functions that are written in respective blocks shown in FIG. 2. The functions and the operations shown in FIG. 2 are performed in time-series order in the downward direction in FIG. 2.

First, at step 201, using the information requester terminal 102 the information requester requests the management server 104 to have himself registered as a member information requester who will receive the selling price information mediating service being discussed. In response, at step 202, the management server 104 registers the information requester at the information requester terminal 102 as a member information requester. Similarly, at step 203, using his information provider terminal 103 each information provider requests the management server 104 to have himself registered as a member information provider. At step 204, the management server 104 registers each information provider at his information requester terminal 102 as a member information provider. Specifically, a member list having data to be described below is generated in a prescribed memory area of the management server 104.

A member number and a password or the like that is used in receiving the service are assigned to each of the information requester and the information providers who have been registered as members of the membership system. Recorded in the member list, the information requester and the information providers are allowed to use the system of the selling price information mediating service. It is possible for one user to be given rights of both of a member information requester and a member information provider. The management server 104 may automatically assign individual data such as member numbers. Alternatively, the operation manager may assign such individual data using a terminal.

It is preferable that a large number of information requesters and information providers be registered as members by inviting a broad range of people (e.g., the public) to join the system. When each information requester or information provider is registered as a member, his identity is confirmed and a settlement method for payment or reception of each of an information supply fee, a mediation commission, and an informer fee.

After completion of the member registration, communication relating to request for and provision of selling price information can be started.

Next, a procedure of information request and provision will be described.

When the information requester who has been registered as a member wants to survey lower selling prices of a commodity that is marketed commonly and stores selling it, at step 205 he issues a price survey request to the management server 104 using the information requester terminal 102.

A survey request procedure will be described below with reference to FIGS. 3-8 in addition to FIGS. 1 and 2. FIGS. 3-8 show pictures of various menus, input and display forms, etc. that are displayed on each terminal in the system of the selling price information mediating service.

Figure 3:
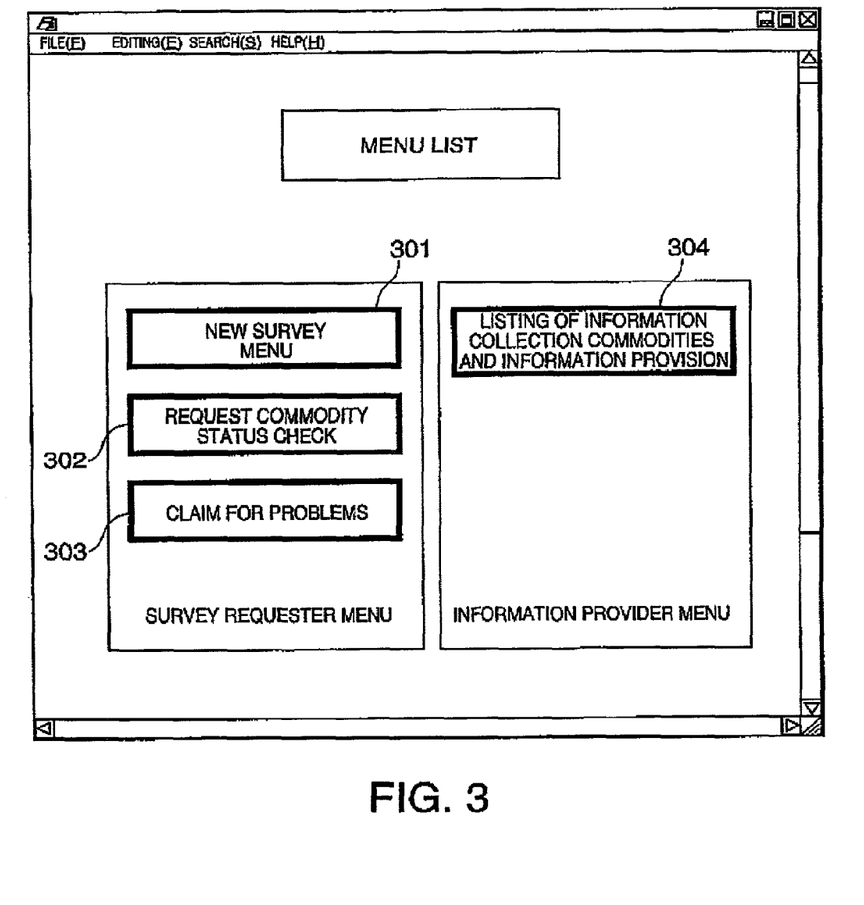
FIG. 3 shows an initial menu picture of the selling price information mediating service according to the embodiment of the present invention that is displayed on an information requester terminal or an information provider terminal.

Using the information requester terminal 102 the information requester calls and connects the management server 104 via the network 101, and thereby receives an initial menu picture as shown in FIG. 3 and has it displayed on the information requester terminal 102. A prescribed secret key code may be so set as to allow only the registered members to obtain this picture at this step. Alternatively, the password of each member may be used combined with the member number for this purpose.

In the initial menu picture, a survey requester menu for an information requester including a "New survey request" button 301, a "Request commodity status check" button 302, and a "Claim" button 303, and an information provider menu including a "Listing of information collection commodities and information provision" button 304 are displayed as a menu list.

Figure 4:
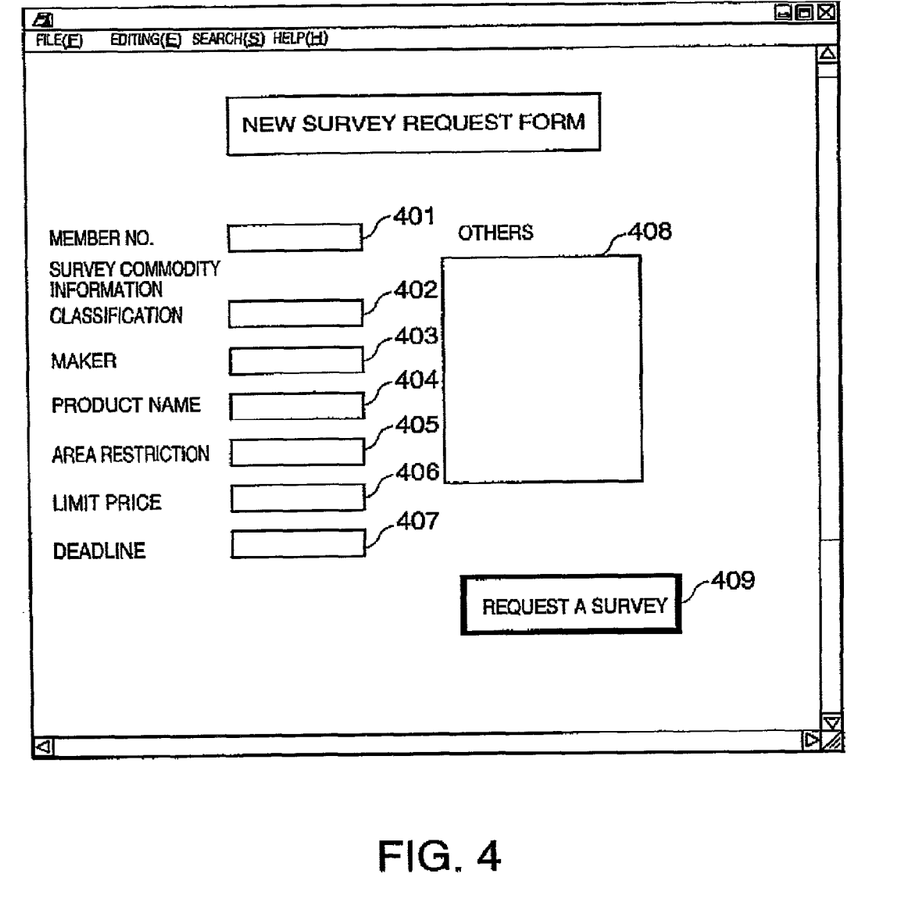
FIG. 4 shows a picture of a new survey request form that is displayed upon selection of an item "New survey request" in the picture of FIG. 3.

If the information requester manipulates the "New survey request" button 301 in the initial menu picture, a new survey request form as shown in FIG. 4 that is a form to be used for requesting a new survey is displayed.

For example, the new survey request form has input spaces for information necessary for the survey: a member number space 401, input spaces for surface commodity information that are a classification space 402, a maker space 403, and a product name space 404, an area restriction space 405, a limit price space 406, a deadline date/time space 407, and an others space 408 as a description space. The information requester inputs on the information requester terminal 102, to the respective spaces of this form, pieces of information necessary for the survey that are his member number, pieces of information that identify a commodity or the like for which he requests information, an area where the survey should be performed, an upper limit offer price, a deadline date/time of the information collection, and other supplemental information. After the input of the above information, the information requester manipulates a "Request a survey" button 409. As a result, step 205 shown in FIG. 2 is executed, whereby the contents of the survey request of the information requester are registered on the management server 104.

On the other hand, using the information provider terminal 103 the information provider calls and connects to the management server 104 via the network 101, and thereby has the initial menu picture as shown in FIG. 3 displayed on the information provider terminal 103. If the information provider manipulates the "Listing of information collection commodities and information provision" button 304 in the initial menu picture, whereby at step 206 the contents of survey requests including the above-described survey request are listed in a price survey request commodity list picture having a form of FIG. 5, for example. It is expected that the labor of the information provider's searching for an object to which to provide information increases as the number of survey request commodities increases. A target-limited search is enabled by causing the information providers to select a classification of commodities in advance.

Figure 5:
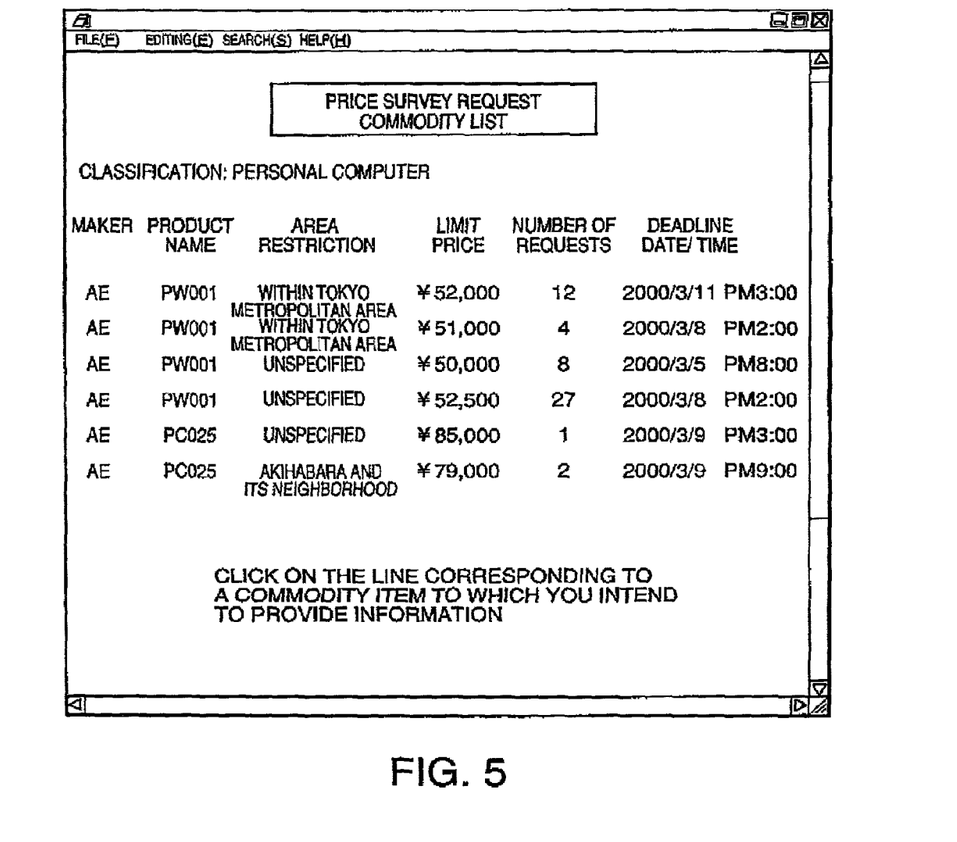
FIG. 5 shows a price survey request commodity list picture that is displayed when a "Listing of information collection commodities and information provision" button is manipulated in the picture of FIG. 3.

In the exemplary list of survey request commodities shown in FIG. 5, "personal computer" is designated as a classification of price survey request commodities and pieces of information of each request item that are a maker, a product name, area restriction, a limit price, the number of requests, and a deadline date/time are displayed as a list.

Figure 6:
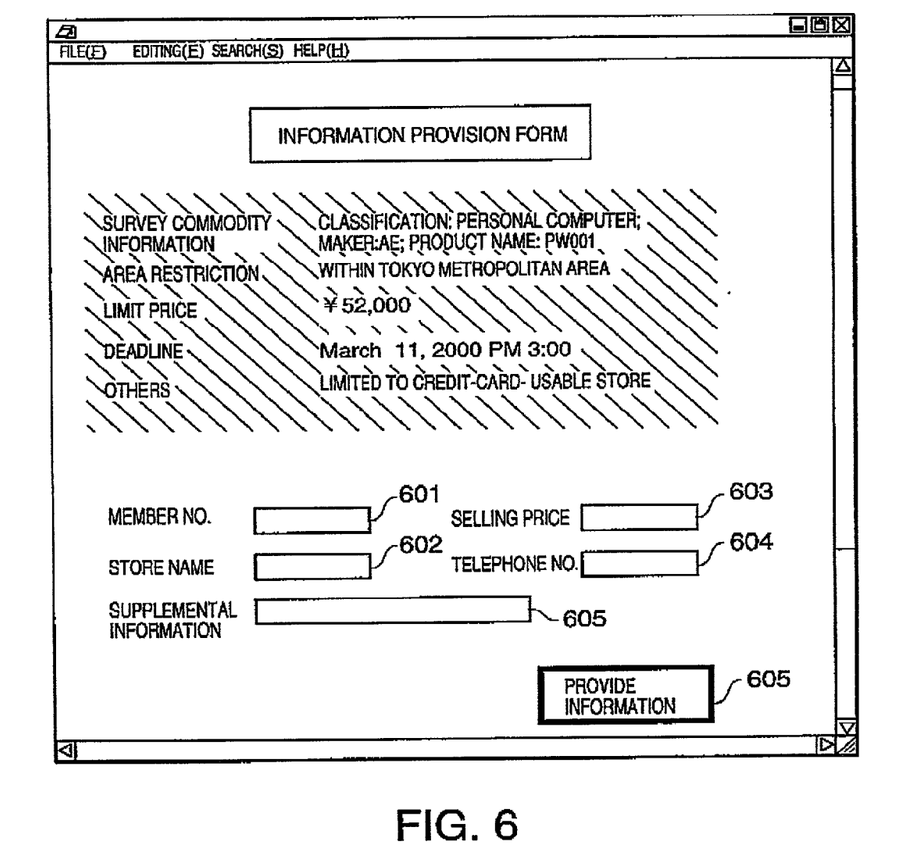
FIG. 6 shows an information provision form picture that is displayed when the line corresponding to a certain request item is manipulated in the picture of FIG. 5.

If the list includes a request item for which the information provider can provide selling price information, he provides the information at step 207. If the information provider decides selection of that line in the list of FIG. 5 which correspond to a request to which he intends to provide selling price information, an information provision form picture as shown in FIG. 6 is displayed on the information provider terminal 103. In this example, FIG. 6 corresponds to a case that the request item on the top line of the list of FIG. 5 has been selected.

In the information provision form, pieces of information input by an information requester such as the above-mentioned survey request information, area restriction, and limit price as well as input spaces that are a member number space 601, a store name space 602, a selling price space 603, a telephone number space 604, and a supplemental information space 605 are displayed. The information provider inputs his member number to the member number space of the form 601, inputs a selling price that he possesses to the selling price space 603, and inputs information relating to a store to the store name space 602 and the telephone number space 604. If necessary, the information provider inputs supplemental information to the supplemental information space 605. After completion of the input, to make a decision, the information provider manipulates a "Provide information" button 606 in the picture. As a result, the provided information is sent to the management server 104 over the network 101 and stored therein in a prescribed area. The information providing operation (step 207 in FIG. 2) is thus completed.

Figure 7:
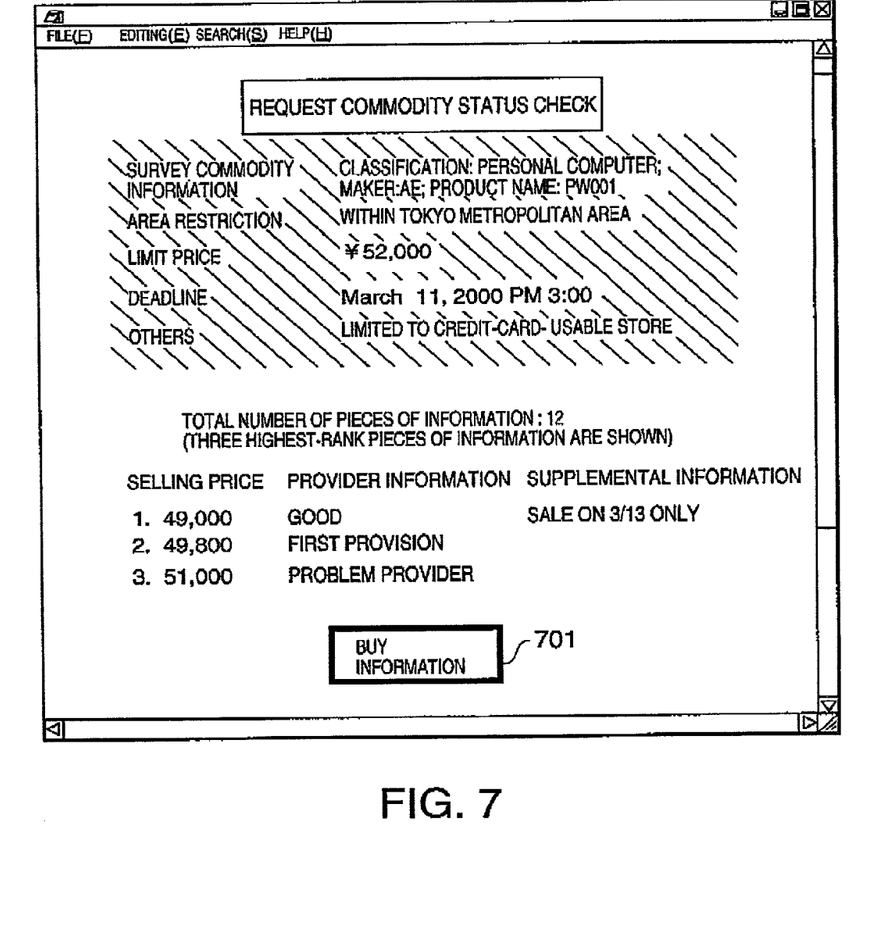
FIG. 7 shows a request commodity status confirmation picture that is displayed when a "Request commodity status check" button is selected in the picture of FIG. 3.

When the deadline date/time specified by the information requester terminal 102 has been reached, at step 208 the management server 104 collects pieces of information received from information provider terminals 103 so far and stores those pieces of information as collected selling price information. Part of the collected selling price information thus stored is displayed on the request commodity status confirmation picture as shown in FIG. 7 when the information requester manipulates the "Request commodity status check" button 302 in the initial menu picture shown in FIG. 3 that is displayed on the information requester terminal 102 by calling the management server 104. The information requester can confirm the part of the collected selling price information using this picture (step 209).

In the request commodity status confirmation picture shown in FIG. 7, three pieces of information with three lowest prices among the collected pieces of selling price information are displayed. Rather than all the information provided, only selling prices, provider information, and supplemental information are shown or publicized in this picture. An information provider who caused a problem in the past can be indicated as provider information. That is, the management server 104 manages and collects pieces of such statistical information of problem-causing histories as an information provider who has provided one of the pieces of price Information concerned presented an erroneous price in the past and holds those in a prescribed area For example, Such information can be displayed as provider information.

Based on the information in this picture displayed on the information requester terminal 102, the information requester considers whether to buy the collected selling price information in the picture. If the information requester has decided to buy the collected selling price information, at step 210 he manipulates a "Buy information" button 701 in the picture. Informed of the manipulation of the "Buy information" button 701, the management server 104 requests the information requester (member) to pay an information supply fee and a mediation commission according to a prescribed procedure and collect those from the information requester by a settlement method that was determined at the time of member registration, for example electronic payment.

After completion of the settlement has been confirmed, at step 211 the management server 104 sends the collected selling price information thus bought to the information requester terminal 102 by Electronic mail (hereinafter call e-mail).

Figure 8:
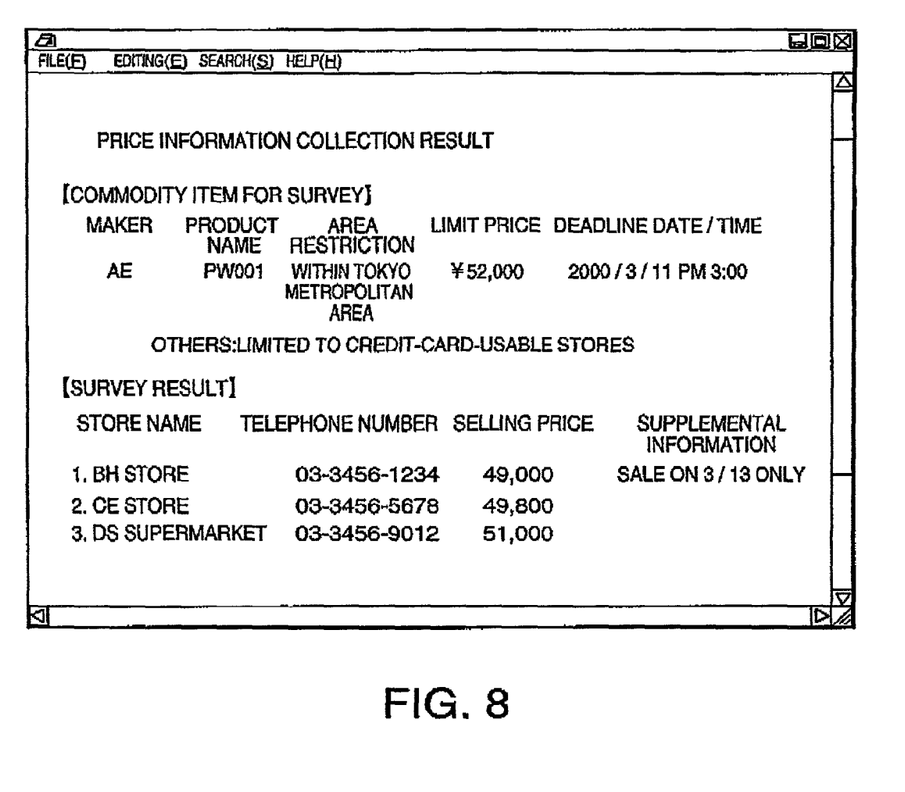
FIG. 8 shows a price information collection result picture that is displayed when a "Buy information" button is manipulated in the picture of FIG. 7.

FIG. 8 shows an example of a manner of showing information in the e-mail. As shown in FIG. 8, not only the selling prices but also information necessary to buy the commodity such as store names and their telephone numbers is shown in the e-mail.

The information requester confirms, in a prescribed period, whether the received information does not have an error. If there is no error, the information requester need not do anything. In this manner, the information requester can acquire all the information necessary to buy the commodity that is included in the selling price information thus bought and supplied. At a time point when the confirmation period has elapsed, the management server 104 considers that the information delivery has completed. At step 213, as the operation manager the management server 104 performs settlement processing for unsettled informer fees and commissions between the information requester, the information providers, and the operation manager according to settlement methods that were determined at the time of member registration.

In the above description, the management server 104 obtains information from the information requester terminal 102 or the information provider terminal 103 upon manipulation of a button in a picture and processes the obtained information using a prescribed program. Alternatively, the operation manager who uses an operation manager terminal of the management server 104 may cause information received from the information requester terminal 102 or the information provider terminal 103 to be displayed on the screen of the terminal and processes the received information according to a displayed picture.

The information requester has an opportunity of making a claim for problems against the management server 104 or the operation manager in case the received information has such the problem as the received information is in error.

Figure 9:
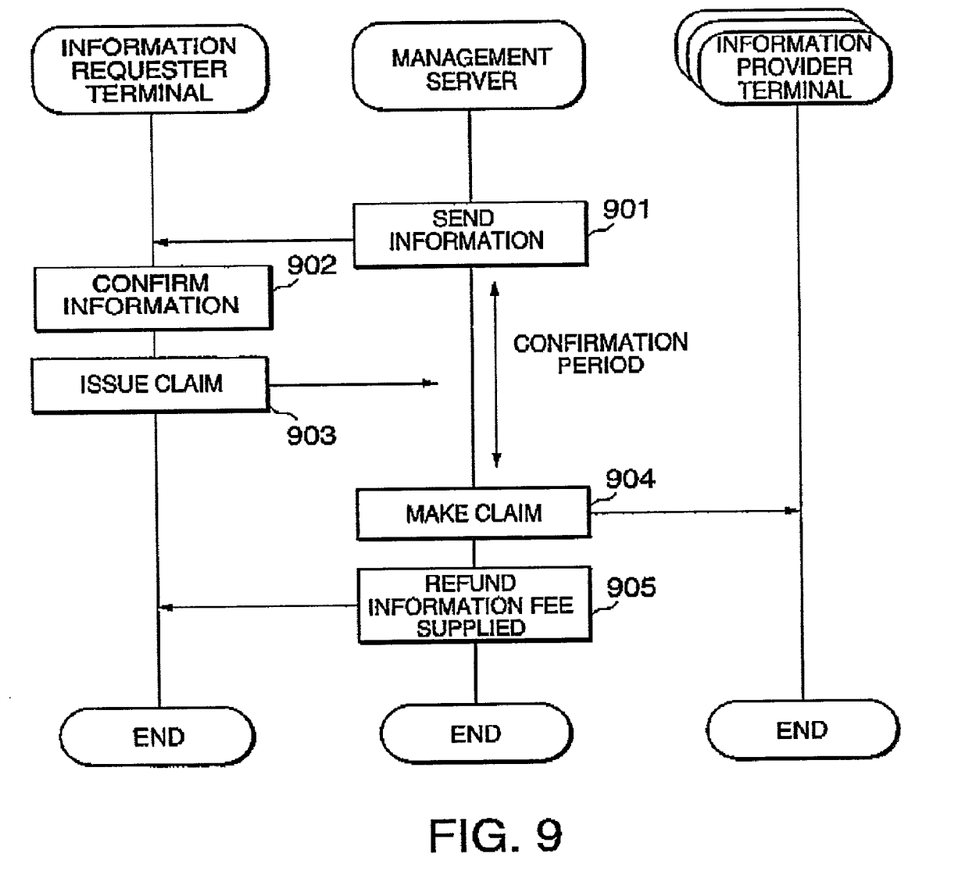
FIG. 9 is a flowchart showing exemplary functions and operations that are performed when a claim for problems is issued to an information provider by manipulating a "Claim" button in the picture of FIG. 3.

FIG. 9 is a flowchart showing exemplary operations that are performed in making a claim for problems. FIG. 9 shows a flow of operations that are performed in making a claim for problems after the management server 104 sends the collected selling price information to the information requester terminal 102 at step 211 in FIG. 2.

At step 903, the information requester issues a claim for problems to the management server 104 or the operation manager in the above-mentioned prescribed confirmation period by manipulating the "Claim" button 303 in the initial menu picture shown in FIG. 3. At step 904, the operation manager informs the information provider concerned of the claim for problems and requests him to make a necessary correction. In this case, at step 905, the information requester is refunded the fees that he paid previously.

Information indicating whether a problem such as a claim for problems has occurred is recorded in a prescribed area of the management server 104, and will be conveyed to an information requester as provider information (described above) in a future transaction. The system can be so configured as to prevent recurrence of a problem by, for example, expelling a member who has caused many problems and refusing acceptance of information from the member after the expelling.

The above-described selling price information mediation service method according to the invention allows an information requester to collect, over a network, information about stores that market a desired commodity at lower prices and to buy the information. An information provider can sell information such as a selling price he possesses. An operation manager can realize a business in which he earns commissions through mediation between an information requester and information providers.

Provision of erroneous information can be prevented by employing a membership system in which every one of information requesters and information providers is made members and the identity of an information requester or an information provider is clarified when he is registered as a member. Even if erroneous information is provided, it is easy to impose sanction against the information provider concerned. Disclosing, to an information requester, information of an information provider who caused a problem in the past can help the information requester to judge the reliability of information received.

Setting a limit price at the time of requesting information prevents provision of information with a higher selling price of a commodity concerned than an upper limit price that the information requester assumes, as well as buying of meaningless information. Restricting an area where stores should be located at the time of requesting information makes it possible to obtain only information of stores from which the information requester can buy a commodity concerned.

An operation manager collects pieces of information provided and discloses only part of the collected information, that is, information excluding information about stores. This can prevent an information requester from using selling price information without buying it.

Paying an informer fee to only persons who provided pieces of information that have been supplied to an information requester makes it unnecessary to pay an informer fee to an information provider who provided meaningless information.

Where a large number of members use this system, an advertisement charge can be received from a third party who places an advertisement in the service.

What is claimed is:

1. A selling price information mediation service method for mediating and supplying selling price information, which includes selling prices of a commodity in respective stores and information about the respective stores, over a network, the method comprising:

receiving, at a server, from an information requester terminal, an information request that requests selling price information about a commodity, and communicating the information request directly to a plurality of information provider terminals;

collecting selling price information at the server which matches the information request from at least one of said plurality of information provider terminals in response to the information request, and generating collected selling price information that matches the information request;

supplying the collected selling price information from the server to said information requester terminal, and charging said information requester terminal a prescribed information supply fee and mediation commission; and providing payment of a prescribed informer fee from the server to the at least one of said plurality of information provider terminals that provided the pieces of selling price information that match the information request.

2. A selling price information mediation service method according to claim 1, wherein a selling price information mediating service employs a membership system, and said method further comprises:

registering, at the server, an information requester at said information requester terminal after receiving registration information from said information requester and registering information providers at said information provider terminals as members after receiving registration information from said information providers; and identifying an information requester or an information provider who has caused a problem by distributing erroneous information, upon occurrence of the problem.

3. A selling price information mediation service method according to claim 2, further comprising keeping a history of the information provider who caused a problem by distributing erroneous information and disclosing the history to said information requester terminal.

4. A selling price information mediation service method according to claim 1, wherein the information request includes information of a selling price limit of the commodity, and further comprising supplying said information requester terminal with only pieces of selling price information with selling prices each of which is at most the selling price limit.

5. A selling price information mediation service method according to claim 1, wherein the information request includes information indicating a restrictive area where an information requester at said information requester terminal can buy the commodity, and further comprising supplying said information requester terminal with only pieces of selling price information of stores located in the restrictive area.

6. A selling price information mediation service method according to claim 1, further comprising supplying said information requester terminal with a portion of the collected selling price information, excluding information about stores, before supplying the remaining collected selling price information to said information requester terminal, wherein the remaining collected selling price information is supplied after the charging of said prescribed information supply fee.

7. A selling price information mediation service method according to claim 1, further comprising providing payment of said prescribed informer fee to a portion of said at least one information provider terminals that provided selling price information actually supplied to said information requester terminal after supplying the collected selling price information to said information requester terminal.

8. A system for mediating and providing selling price information over a network, the system comprising:

at least one information requester terminal which requests selling price information;

a plurality of information provider terminals, each of which provide selling price information for a retailer; and a management server which mediates selling price information;

wherein the mediating selling price information comprises:

receiving an information request that requests selling price information about a commodity from at least one information requester terminal, and communicating the information request directly to a plurality of information provider terminals;

collecting pieces of selling price information which match the information request from at least one of said plurality of information provider terminals in response to the information request, and generating collected selling price information that matches the information request;

supplying the collected selling price information to said information requester terminal, and charging said information requester terminal a prescribed information supply fee and mediation commission; and providing payment of a prescribed informer fee to the at least one of said plurality of information provider terminals that provided the pieces of selling price information that match the information request.

9. A system according to claim 8, wherein said management server comprises a membership system, and said membership system comprises:

registering an information requester at said information requester terminal after receiving registration information from said information requester and registering information providers at said information provider terminals as members after receiving registration information from said information providers; and identifying an information requester or an information provider who has caused a problem by distributing erroneous information, upon occurrence of the problem.

10. A system according to claim 9, wherein said membership system keeps a history of the information provider who caused a problem by distributing erroneous information and discloses the history to said information requester terminal.

11. A system according to claim 8, wherein the information request includes information of a selling price limit of the commodity, and the management server supplies said information requester terminal with only pieces of selling price information with selling prices each of that is at most the selling price limit.

12. A system according to claim 8, wherein the information request includes information indicating a restrictive area where an information requester at said information requester terminal can buy the commodity, and said management server supplies said information requester terminal with only pieces of selling price information of stores located in the restrictive area.

13. A system according to claim 8, wherein said management server supplies said information requester terminal with a portion of the collected selling price information, excluding information about stores, before supplying the remaining collected selling price information to said information requester terminal, wherein the remaining collected selling price information is supplied after the charging of said prescribed information supply fee.

14. A system according to claim 8, wherein said management server performs providing payment of said prescribed informer fee to a portion of said at least one information provider terminals that provided selling price information actually supplied to said information requester terminal after selling the collected selling price information to said information requester terminal.

15. A management server for mediating selling price information over a network, the management server comprising:
- a receiving unit which receives an information request which requests selling price information about a commodity from at least one information requester terminal,
- a communication unit which communicates the information request directly to a plurality of information provider terminals;
- a collecting unit which collects pieces of selling price information matching the information request from at least one of said plurality of information provider terminals, and generates collected selling price information that matches the information request;
- a supplying unit which supplies the collected selling price information to said information requester terminal and charges said information requester terminal a prescribed information supply fee and mediation commission; and
- a processing unit which provides payment of a prescribed informer fee to the at least one of said plurality of information provider terminals that provided the pieces of selling price information that match the information request.

16. A selling price information mediation service method according to claim 2, wherein said registration information comprises at least one of a registration identification and a password.

17. A system according to claim 9, wherein said registration information comprises at least one of a registration identification and a password.

* * * * *